(12) United States Patent
Tsai

(10) Patent No.: US 6,748,623 B1
(45) Date of Patent: Jun. 15, 2004

(54) CHAIR CASTER

(76) Inventor: Po-Chuan Tsai, P.O. Box 90, Tainan City (TW)

( * ) Notice: Subject to any disclaimer, the term of this patent is extended or adjusted under 35 U.S.C. 154(b) by 0 days.

(21) Appl. No.: 10/304,682

(22) Filed: Nov. 27, 2002

(51) Int. Cl.[7] .......................... A47B 91/00; B60B 33/00
(52) U.S. Cl. ........................... 16/47; 16/35 D; 16/45
(58) Field of Search .................. 16/45, 46, 47, 16/48, 18 R, 35 D, 44

(56) References Cited

U.S. PATENT DOCUMENTS

| | | | | |
|---|---|---|---|---|
| 3,815,173 A | * | 6/1974 | Haussels | 16/45 |
| 4,054,964 A | * | 10/1977 | Kaneko | 16/20 |
| 4,077,088 A | * | 3/1978 | Melara | 16/47 |
| 4,219,904 A | * | 9/1980 | Melara | 16/47 |
| 4,351,084 A | * | 9/1982 | Fontana | 16/45 |
| 4,377,883 A | * | 3/1983 | Folson | 16/47 |
| 4,649,595 A | * | 3/1987 | Shane | 16/18 CG |
| 4,707,881 A | * | 11/1987 | Van Hoye | 16/44 |
| 5,119,525 A | * | 6/1992 | Melara | 16/18 R |
| 5,259,088 A | * | 11/1993 | Yang | 16/47 |

FOREIGN PATENT DOCUMENTS

| | | | |
|---|---|---|---|
| JP | 11-180103 | * | 7/1999 |
| JP | 2002-211204 | * | 7/2002 |
| JP | 2003-2004 A | * | 1/2003 |

* cited by examiner

*Primary Examiner*—Chuck Y. Mah

(57) ABSTRACT

A chair caster in the invention mainly includes a wheel holder, a spindle, a wheel axle, two wheel bodies, two shake-proof washers and two caps. Each of the two wheel bodies is provided with a recessed chamber disposed in an inner side thereof and capable of being fitted with a shake-proof washer made of a soft rubber material, thereby enabling the chair caster to lower shaking and noise in rolling under the resilience of the shake-proof washers and providing better strength to the whole structure of the chair caster so as to prolong the working life.

3 Claims, 4 Drawing Sheets

CHAIR CASTER

BACKGROUND OF THE INVENTION

1. Field of the Invention

This invention relates to a chair caster, particularly to one having two wheel bodies each provided with a recessed chamber disposed in an inner side thereof and capable of being fitted with a shake-proof washer made of a soft rubber material, thereby enabling the chair caster to lower shaking and noise in rolling under the resilience of the shake-proof washers and providing better strength to the whole structure of the chair caster so as to prolong the working life.

2. Description of the Prior Art

Generally speaking, a known conventional chair caster 1, as shown in FIG. 1, has a wheel holder 10, a mounting seat 11 disposed above the wheel holder 10, and a wheel body 13 disposed below the wheel holder 10 and capable of being pivoted with the wheel holder 10 by a wheel axle 12. After the mounting seat 11 is combined with a lower portion of a chair, the wheel body 13 can roll to move the chair. However, the wheel body 13 made of a hard material will make much noise when rolling on the hard ground to influence the surrounding quietness and often shake all the way in rolling to make a user feel very uncomfortable.

Another known conventional chair caster 2, as shown in FIG. 2, has a wheel holder 20, a wheel axle 23 and two wheel bodies 24. The wheel holder 20 has a spindle 22 disposed at an upper portion thereof, and a through hole 21 disposed therein in a transversal direction and capable of being extended through by the wheel axle 23. Each of two wheel bodies 24 has a hollow inner side disposed opposite to each other and provided with an axle housing 25 protruding thereon and a plurality of reinforced ribs 26 disposed therein. The two wheel bodies 24 can be combined with both sides of the wheel holder 20 by having the two axle housings 25 respectively engaged with both ends of the wheel axle 23. After the spindle 22 is combined with a lower portion of a chair, the chair caster 2 can roll to move the chair. Although such chair caster 2 can make less noise in rolling, it still lacks a shake-proof effect because the hollow inner sides of the two wheel bodies 24 make circumferential walls of the two wheel bodies 24 become very thin, which is unable to provide enough strength to support the structure of the two wheel bodies 24 so that the two wheel bodies 24 are easily damaged when impacted by outer force, thus greatly shortening the working life.

SUMMARY OF THE INVENTION

The main purpose of the invention is to offer a chair caster capable of lowering the shaking and noise of a chair in moving.

The main feature of the invention is to provide a chair caster having two wheel bodies each provided with a recessed chamber and a shake-proof washer, wherein the recessed chamber is disposed in an inner side of each of the two wheel bodies so that a circumferential wall with thinner thickness with thinner thickness is formed between the recessed chamber and an outer wall surface of each of the two wheel bodies; the shake-proof washer made of a rubber material is capable of being fitted in the recessed chamber.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
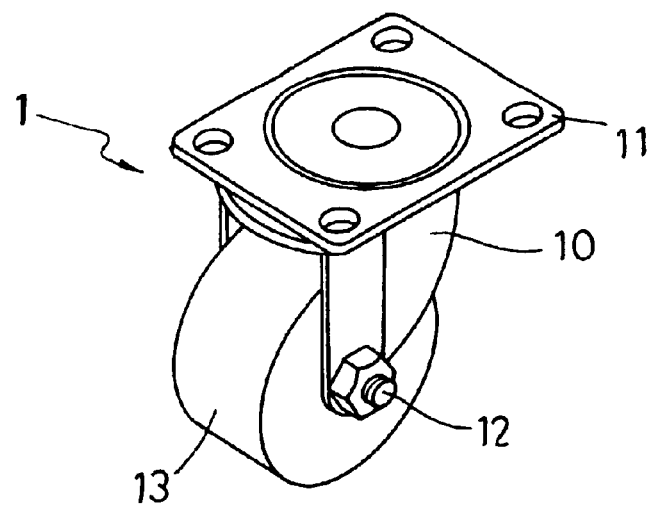
FIG. 1 is a perspective view of a known conventional chair caster.
Figure 2:
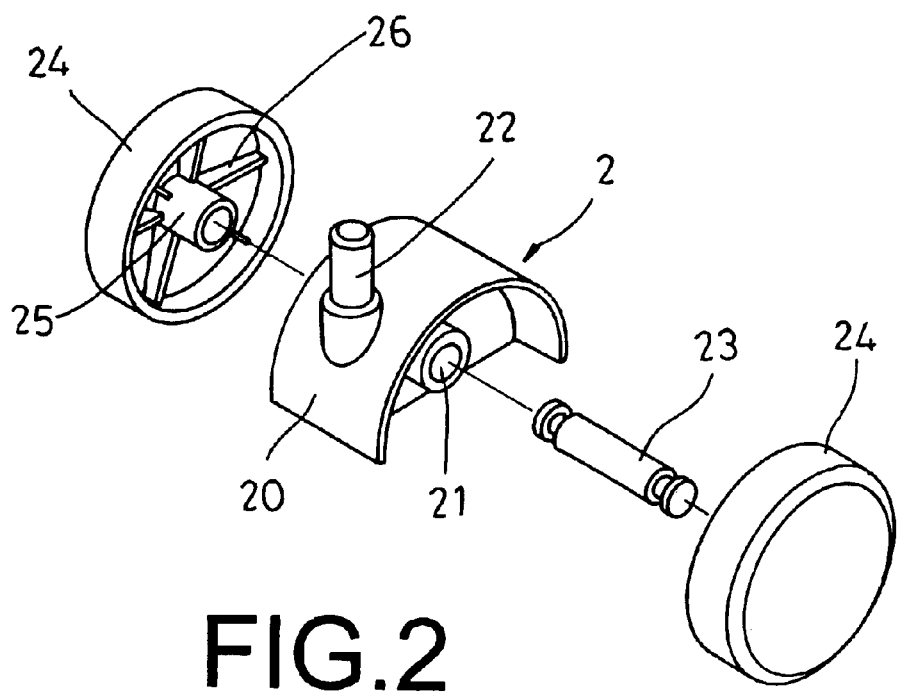
FIG. 2 is an exploded perspective view of another known conventional chair caster.
Figure 3:
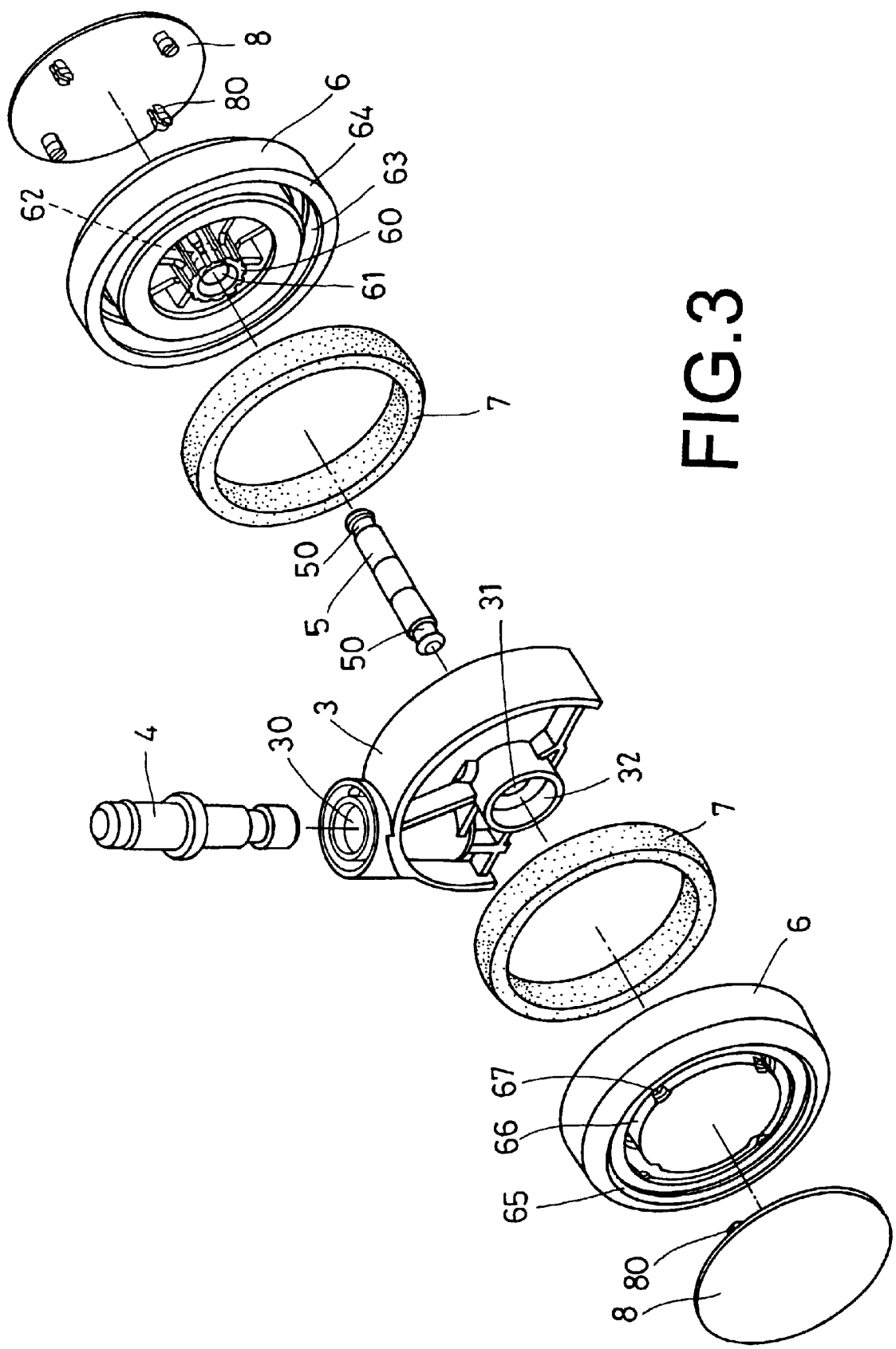
FIG. 3 is an exploded perspective view of a chair caster in the present invention.

A preferred embodiment of a chair caster in the present invention, as shown in FIG. 3, mainly includes a wheel holder 3, a spindle 4, a wheel axle 5, two wheel bodies 6, two shake-proof washers 7 and two caps 8 as main components.

The wheel holder 3 has a spindle hole 30 disposed at an upper portion thereof and a through hole 31 disposed therein in a transversal direction. Two openings 32 are respectively disposed at both sides of the through hole 31 of the wheel holder 3.

The spindle 4 has one end extending into the spindle hole 31 of the wheel holder 3 and the other end protruding upwards.

The wheel axle 5 capable of extending through the through hole 31 of the wheel holder 3 has two ends respectively protruding outwardly out of both sides of the wheel holder 3. A ring groove 50 is disposed proximate to each of the two ends of the wheel axle 5.

The two wheel bodies 6 capable of being combined with both sides of the wheel holder 3 has two axle housings 60 respectively disposed at centers of two opposite inner sides of the two wheel bodies 6. Two axle holes 61 are respectively disposed in the two axle housings 60 and each of the two axle holes 61 is provided with a circumferential ridge 62 disposed therein. Two recessed chambers 63 are respectively disposed in the two opposite inner sides of the two wheel bodies 6 so that two circumferential walls 64 with thinner thickness are respectively formed between the two recessed chambers 63 and two outer wall surfaces of the two wheel bodies 6. Two recesses 65 are respectively disposed in two opposite outer sides of the two wheel bodies 6, and each of the two recesses 65 has an annual groove 66 provided with a plurality of engagement grooves 67 disposed therein.

Two shake-proof washers 7 made of rubber materials are capable of being respectively fitted in the two recessed chambers 63 of the two wheel bodies 6.

Two caps 8 are capable of respectively covering on the two recesses 65 of the two wheel bodies 6 and each of the two caps 8 is provided with a plurality of engagement members 80 disposed on an inner side thereof.

Figure 4:
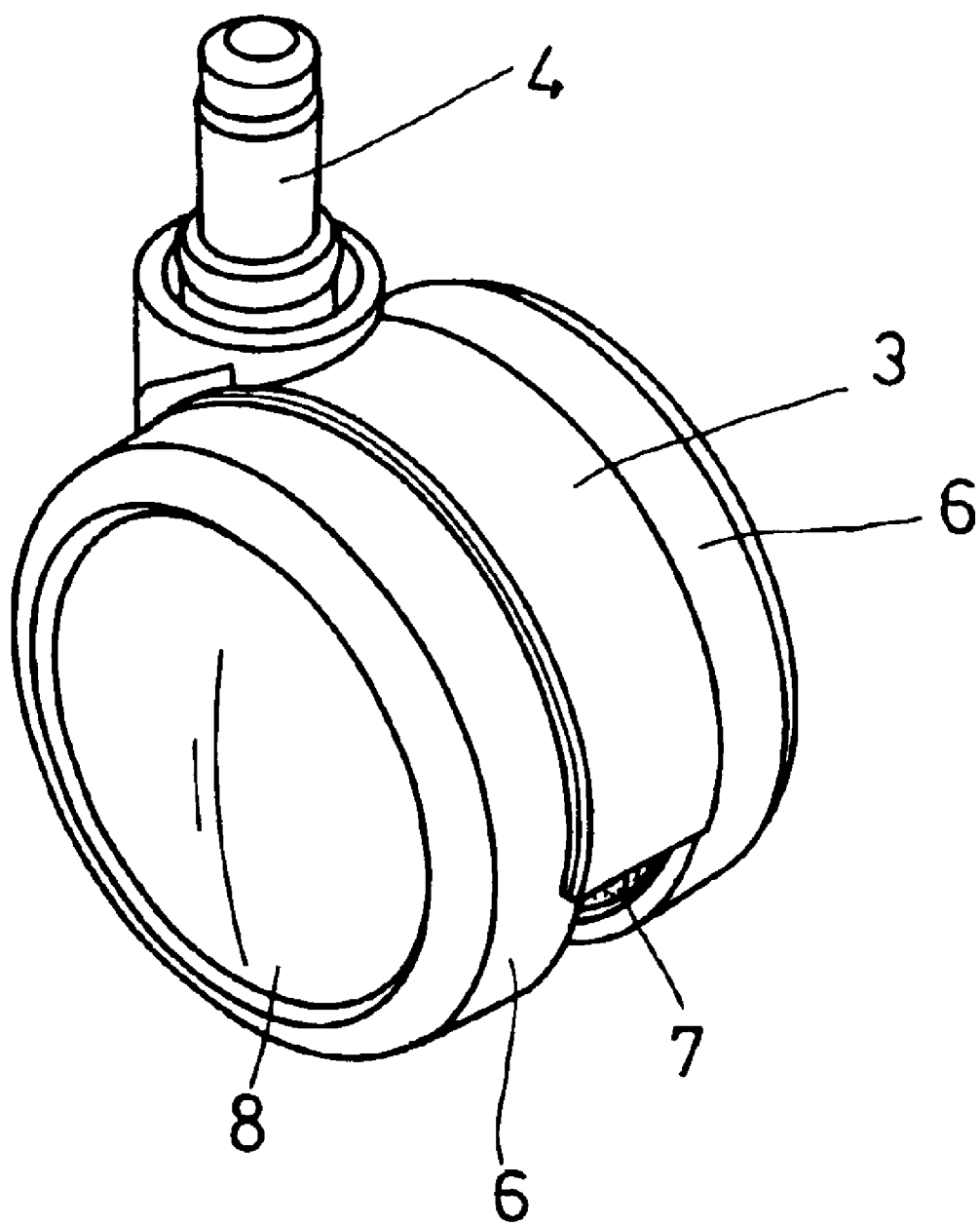
FIG. 4 is a perspective view of the chair caster in the present invention; and, FIG. 5 is a sectional view of the chair caster in the present invention.
Figure 5:
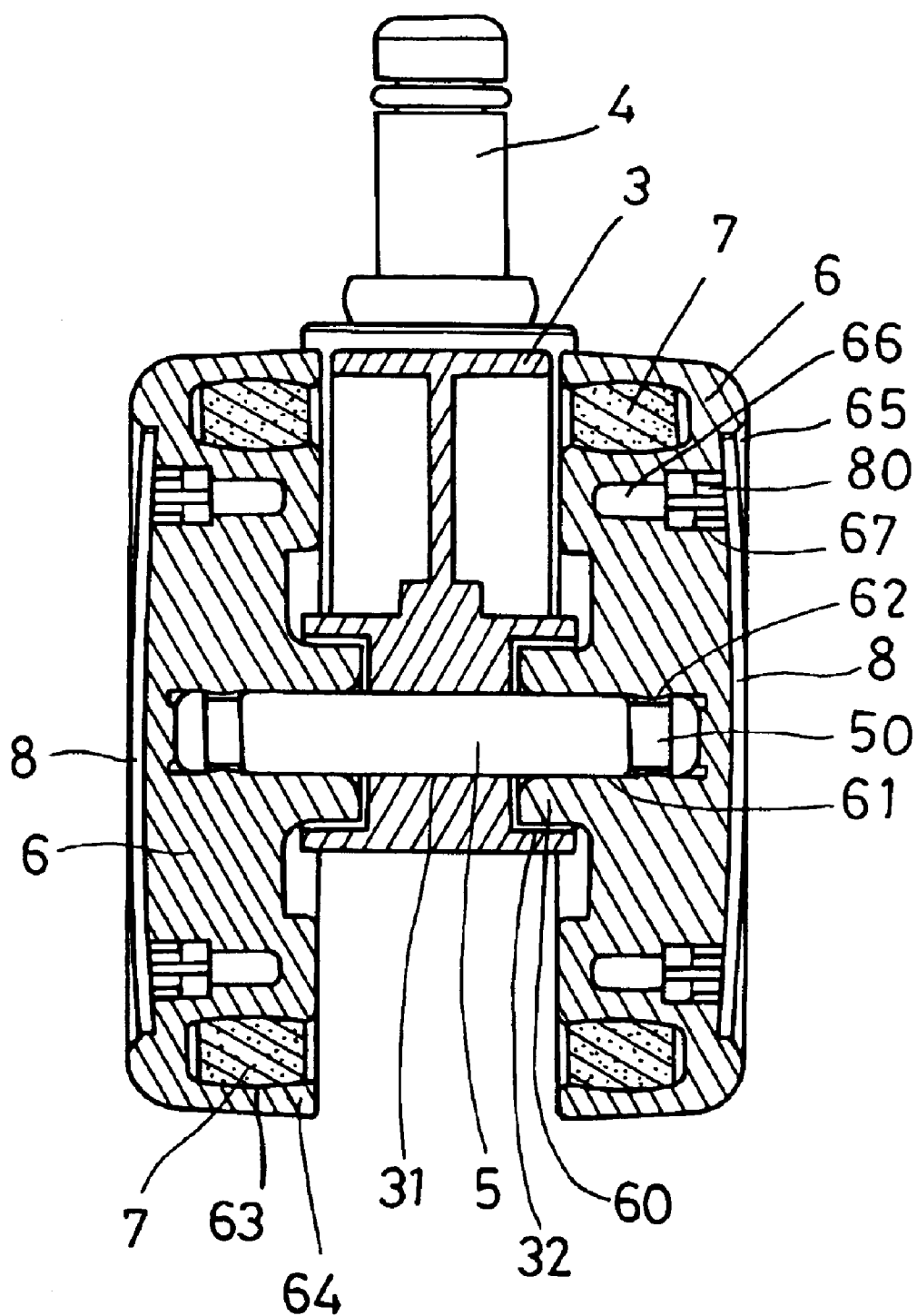

In assembling, referring to FIGS. 3, 4 and 5, firstly fit the two shake-proof washers 7 respectively into the two recessed chambers 63 of the two wheel bodies 6. Secondly, cover the two caps 8 respectively on the two recesses 65 of the two wheel bodies 6 with the plurality of engagement members 80 of the two caps 8 firmly engaged in the plurality of engagement grooves 67 of the recesses 65 of the two wheel bodies 6. Thirdly, extend one end of the spindle 4 into the spindle hole 30 of the wheel holder 3 to be fixed in position. Fourthly, extend the wheel axle 5 through the through hole 31 of the wheel holder 3 with the two ends of the wheel axle 5 respectively protruding outwardly out of both sides of the wheel holder 3. Finally, combine the two wheel bodies 6 respectively with both sides of the wheel holder 3 firmly by having the two axle housings 60 of the two wheel bodies 6 respectively inserted into the two openings 32 of the wheel holder 3 to make the two ends of the wheel axle 5 respectively extending into the two axle holes 61 of the two wheel bodies 6 and to make the two ring grooves 50 of the wheel axle 5 respectively engaged by the two circumferential ridges 62 of the two axle holes 61 of the two wheel bodies 6, by which a whole assemblage of the chair caster of the present invention is completed with convenience and quickness.

In using, firstly combine the chair caster of the present invention with a lower portion of a chair so that the two wheel bodies 6 of the chair caster can roll to move the chair. Since the two wheel bodies 6 are designed to have the two recessed chambers 63 for being fitted with the two shake-proof washers 7 and to have the two circumferential walls 64 with thinner thickness, the two wheel bodies 6 become very resilient. When rolling on the hard or rough ground, the two thin circumferential walls 64 of the two wheel bodies 6 will be depressed slightly inwardly under the pressure of the chair, in which the resilience of the two shake-proof washers 7 can lower the shaking to achieve a shake-proof effect and make less noise so that a user will feel very comfortable when sitting on the chair. Moreover, the two thin circumferential walls 64 of the two wheel bodies 6 are supported by the resilience of the two shake-proof washers 7 so that the whole structure of the two wheel bodies 6 is strong enough to resist any impact from the hard or rough ground without being damaged so as to prolong the working life.

While the preferred embodiment of the invention has been described above, it will be recognized and understood that various modifications may be made therein and the appended claims are intended to cover all such modifications that may fall within the spirit and scope of the invention.

What is claimed is:

1. A chair caster comprising:

a wheel holder having a spindle hole disposed at an upper portion thereof and a through hole disposed therein in a transversal direction;

a spindle having one end extending into said spindle hole of said wheel holder and the other end protruding upwards;

a wheel axle capable of extending through said through hole of said wheel holder and having two ends respectively protruding outwardly out of both sides of said wheel holder, and a ring groove disposed proximate to each said end;

two wheel bodies; each wheel body being capable of being rotatably connected a respective one of said both sides of said wheel holder, two axle housings; each axle housing being respectively disposed at a center of a respective one of two opposite inner sides of said two wheel bodies, each axle housing being formed with a respective axle hole; and each provided with a circumferential ridge disposed therein for being engaged with said ring groove of each said end of said wheel axle; and, characterized by said two wheel bodies each having a recessed chamber and a shake-proof washer, wherein said recessed chamber is disposed in said inner side of each said wheel body so that a circumferential wall being thinner than the recess chamber is formed between said recessed chamber and an outer wall surface of each said wheel body; said shake-proof washer made of a rubber material is capable of being fitted in said recessed chamber.

2. The chair caster as claimed in claim 1, wherein each of said two sides of said through hole of said wheel holder is formed with a respective opening for being inserted by said two axle housings of said two wheel bodies.

3. The chair caster as claimed in claim 1, wherein each of two opposite outer sides of said two wheel bodies is formed with a respective recess, and each said recess has an annual groove provided with a plurality of engagement grooves disposed therein; and, wherein two caps are capable of respectively covering on said two recesses of said two wheel bodies, and each said cap is provided with a plurality of engagement members disposed on an inner side thereof for being engaged in said plurality of engagement grooves of each said annual groove of each said recess.

* * * * *